John Clarke Tankersley
INVENTOR

ATTORNEY

John Clarke Tankersley
INVENTOR

ATTORNEY

John Clarke Tankersley
INVENTOR

ATTORNEY

John Clarke Tankersley
INVENTOR

ATTORNEY

John Clarke Tankersley
INVENTOR

ATTORNEY

United States Patent Office 3,496,464
Patented Feb. 17, 1970

3,496,464
AUTOMATIC CIRCUIT TESTING APPARATUS INCLUDING IMPEDANCE MATCHED COAXIAL SIGNAL TRANSMISSION SYSTEMS
John Clarke Tankersley, Towson, Md., assignor to AAI Corporation, Cockeysville, Md., a corporation of Maryland
Filed Feb. 2, 1968, Ser. No. 702,662
Int. Cl. G01r 15/12
U.S. Cl. 324—73                             2 Claims

ABSTRACT OF THE DISCLOSURE

An environmental chamber and test apparatus is disclosed for testing an integrated circuit having a plurality of leads. The test apparatus includes a test station having a plurality of contacts, each adapted to engage a lead of an integrated circuit, and connected through a control signal responsive reed switch to a coaxial terminal which is connected by two coaxial cables to one of a plurality of path selector units slidably disposed in a U-shaped bracket. Each path selector unit has two separate electrical paths of transmission line characteristics, each connected by a control signal responsive reed switch to the coaxial terminal and by a plurality of control signal responsive reed switches to a tester having a plurality of AC, DC, and pulse electrical signal generators, a plurality of AC, DC and pulse electrical loads, and a plurality of measuring devices with one of each being connected to the two electrical paths of each path selector unit. Also, the tester has a plurality of measuring devices connected to a probe terminal between the test station and the coaxial terminal. In addition, the tester has a selector controller adapted to apply switch actuating control signals to each reed switch. DC tests are performed by applying control signals to selected reed switches to connect DC measuring devices through one electrical path of the path selector units to selected test station contacts and connect regulated DC electrical signal generators through the other electrical path of some of the path selector units to apply a DC test signal to selected test station contacts, the value of which is regulated in response to the measured value at the same selected contact. AC and pulse tests are performed by supplying control signals to selected reed switches to connect AC or pulse electrical signal generators to selected test station contacts and measuring the result with suitable measuring devices connected to the probe terminals electrically connected to other selected test station contacts. In addition, suitable electrical loads may be connected through path selector units to selected test station contacts to enable the integrated circuit to be tested under loaded conditions.

---

This invention relates to an apparatus for testing a packaged integrated circuit.

In the testing of packaged integrated circuits having a plurality of leads it is desirable to apply different kinds of electrical signals and loads to selected leads and measure the result at other selected leads to determine the electrical characteristics of the circuit. When a DC test operation is performed, it is desirable to also measure the value of the electrical signal being applied to a selected lead of the integrated circuit while the test is being performed to insure that a DC electrical signal having a selected value is maintained at the selected lead. In addition, it is desirable to shield the conductors to prevent signals from being induced into the testing circuit and thereby introducing errors in the test operation. When an RF or fast-rise pulse test operation is performed, it is desirable to maintain a common characteristic impedance throughout the testing circuit and to disconnect all extraneous leads therefrom to prevent reflections, caused by an impedance mismatch, from introducing errors into the test operation.

In addition, when multiple tests are being performed on large quantities of packaged integrated circuits, it is desirable to rapidly change the electrical signals and loads applied to selected leads in a manner which minimizes the delays in the test process resulting from the operations involved in changing the test signals and loads, thereby maximizing the number of packaged integrated circuits tested within a given period of time. Furthermore, it is desirable to modularize the components of the test apparatus which enable different electrical signals to be applied to selected leads of an integrated circuit to facilitate the replacement of faulty units, thus minimizing the loss of time resulting from the malfunction of the testing equipment.

Accordingly, it is a feature of the present invention to provide a test apparatus adapted to apply a plurality of selected electrical signals and loads to selected leads of a packaged integrated circuit and measure the result at other selected leads to determine the electrical characteristics of the circuit.

It is another feature of the present invention to provide a test apparatus having a substantially common characteristic impedance to enable RF and fast rise-time pulse tests to be performed on a packaged integrated circuit without incurring errors resulting from reflections due to impedance mismatches.

It is an additional feature of the present invention to provide a test apparatus capable of rapidly changing the electrical signals applied to selected leads to maximize the number of tests which can be performed within a given period of time.

It is a further feature of the present invention to provide a test apparatus having modular components to facilitate the replacement of malfunctioning parts.

In accordance with the present invention, there is provided a test station having a plurality of contacts each adapted to be engaged by the lead of a packaged integrated circuit and connected through a separate path selector unit to a tester. Each path selector unit has separate electrical paths each connected by a separate control signal responsive switch to one of the test contacts and connected by a plurality of control signal responsive switches to a plurality of separate electrical terminals. The tester has a plurality of DC, RF and pulse electrical signal generators, a plurality of measuring devices and a plurality of electrical loads, each connected to a separate electrical terminal of each path selector unit. In addition, the tester has a selector controller adapted to apply control signals to selected switches of selected path selector units to form electrical paths connecting electrical signal generators to selected test contacts and to form additional electrical paths connecting measuring devices to selected test contacts to measure the value of an electrical signal at the selected contact to determine the electrical characteristics of the packaged integrated circuit engaging the test contacts. Errors due to reflections resulting from impedance mismatches in forming different electrical paths in the path selector units are prevented by providing each path selector unit with an impedance matching coupling through which the plurality of electrical signal generators and measuring devices may be connected to the test station contacts. Furthermore, each path selector unit is modularized into a single package having external connector terminals for easy removable insertion and terminal connection engagement in a suitable bracket to facilitate the replacement of defective units.

Still other objects, features and attendant advantages will become apparent to those skilled in the art from a reading of the following detailed description of a preferred embodiment and mode of practice of the invention taken in conjunction with the accompanying drawings wherein.

Figure 1:
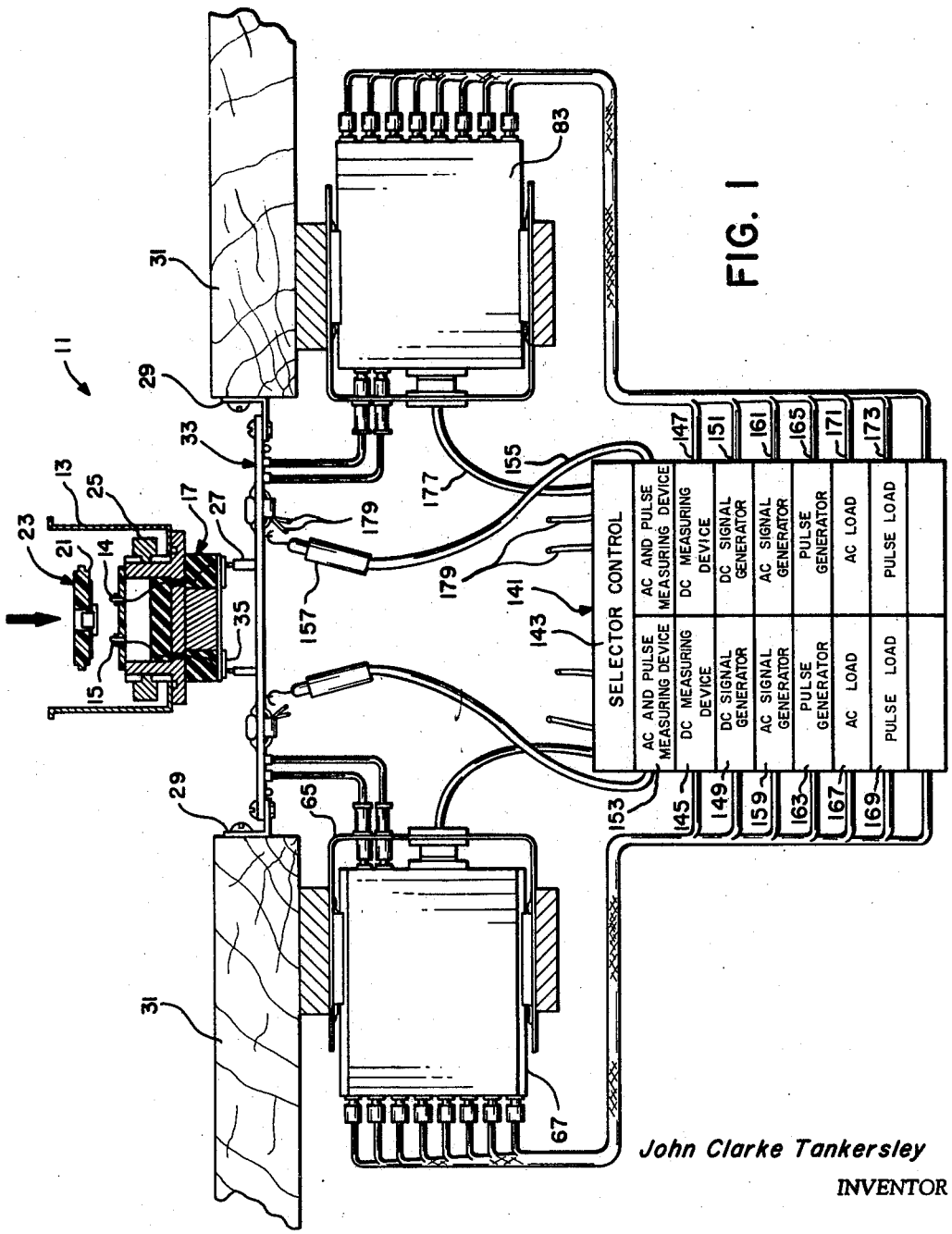
FIG. 1 shows a schematic cross sectional view of the apparatus for testing a packaged integrated circuit according to the present invention with a test station disposed in an environmental chamber and the test contacts connected through a mechanical interface to two path selector units each having a plurality of terminals which are connected to a tester.

Referring now in detail to the figures of the drawings, in FIG. 1 is shown a test apparatus, generally indicated at 11, embodying the principles of the present invention. The test apparatus 11 includes a tank 13 containing a bath 15 of a suitable nonconductive, substantially nonreactive, low residue fluid having a wide liquid temperature range of approximately −55° C. to 150° C. A suitable fluid may preferably be a fluorocarbon compound such as Freon E3 or Freon E4 or a mixture thereof. The fluid bath 15 may be desirably temperature-controlled and serve to condition and stabilize the temperature of a packaged integrated circuit submerged therein for testing purposes.

Partially disposed in fluid sealing relation in the bottom wall of the tank 13 is a test station, generally indicated at 17, having a plurality of upwardly protruding and resiliently biased test contacts 19 submerged in the fluid bath 15. Each of the test contacts 19 are adapted to be engaged by the externally exposed leads 21 of a packaged electrical circuit, generally indicated at 23, which may be a typical conventional carrier-packaged flat pack type integrated circuit assembly, generally referred to herein as a packaged integrated circuit. The packaged integrated circuit 23 may desirably be placed on the test station 17 by any suitable means. Each of the test contacts 19 are connected by a short lead 25 serving as an electrical path and having negligible resistance to one of a plurality of externally exposed electrical contacts 27.

Figure 2:
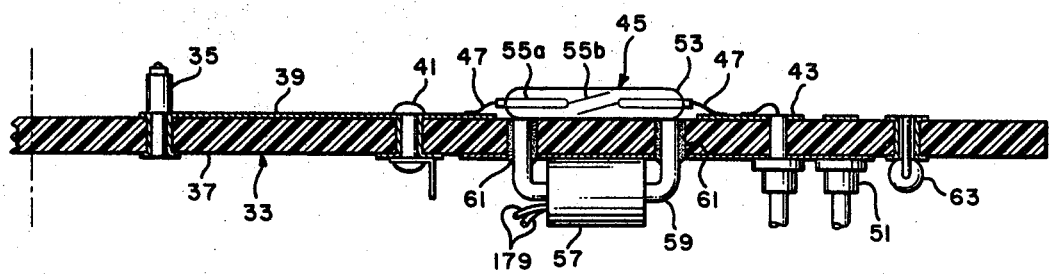
FIG. 2 is a partial cross sectional view of the mechanical interface member which serves to connect the test station to the path selector units.

Mounted beneath the tank 13 between a pair of laterally opposite and interfacing L-shaped brackets 29 attached to a pair of suitable support members 31 is a mechanical interface member, generally indicated at 33, having a plurality of upwardly protruding resiliently biased electrical contacts 35 each positioned to engage one of the externally exposed contacts 27 on the bottom of the test station 17. As more particularly shown in FIG. 2, the mechanical interface member 33 is preferably a printed circuit board 37 having a plurality of electrical paths formed on the upper side with each electrical path extending from a resiliently biased contact 35 in the form of a strip conductor 39 to a probe terminal connection 41 which extends through the printed circuit board 37 and may be engaged by a suitable probe on the bottom side of the mechanical interface member 33. From the probe connection terminal 41 the electrical path extends laterally to a coaxial terminal 43 in the form of a magnetically actuated read switch, generally indicated at 45, having a pair of leads 47 connected between the two terminals 41 and 43. At the coaxial terminal 43 are a pair of coaxial connectors 49 and 51 each having a center conductor electrically connected to the lead of the switch and an outer conductor connected to an electrical ground.

Each reed switch 45 includes a hollow cylindrical longitudinal envelope 53 preferably formed of glass, sealed at its opposite ends to support and enclose two reed elements 55. Each reed element 55 is formed from an eletromagnetic conductive material, e.g. a nickel-iron alloy with a cylindrical terminal portion 55a extending externally from the sealed end of the glass envelope 53 and a flattened deflectable contact portion 55b extending longitudinally into the sealed glass envelope 53 in spaced overlapping relation to the opposite reed element in an unstressed quiescent position. Associated with each reed switch 45 and located on the opposite side of the mechanical interface member 33 is a magnetic field producing switch actuating means in the form of a coil 57 wound on magnetically conductive core 59, the ends of which are disposed in a pair of bores 61 each positioned adjacent to the sealed ends of the glass envelope 53.

Upon energization of the coil 57, a magnetic field is produced having lines of flux extending from the ends of the core 59, through the read elements 55 and across the gap therebetween. The magnetic flux exerts an attractive force between the contact portions 55b of the reed elements 55 which deflects them into electrical engagement with each other to complete the electrical path between the probe connection terminal 41 and the coaxial connector 43. The deflection of each reed element 55 produces a spring force which urges the element away from its deflected position and provides an effective contact separating force. Consequently, upon deenergization of the coil 57, the magnetic flux is removed and the reed elements 55 return to their unstressed quiescent positions. A semiconductor flyback diode 63 is electrically connected across the coil 57 and provides a return path for voltages resulting from deenergization of the coil 57.

Mounted beneath the mechanical interface member 33 and attached by suitable means to the support members 31 are a plurality of U-shaped brackets, generally indicated at 65, and each having a path selector unit, generally indicated at 67, disposed therein. As more particularly shown in FIG. 3, each U-shaped bracket 65 has parallel interfacing and longitudinally extending guide channels 69 on the parallel portions thereof and a pair of spaced female type coaxial connectors 71 and 73 mounted on the transverse portion and which are each electrically connected by a coaxial cable, 75 and 79 to one of the pair of coaxial connectors 49 and 51 connected on the mechanical interface member 33 and electrically connected. The coaxial cables 75 and 77 are of equal lengths to maintain proper phase relationship of signal transmitted therethrough. In addition, a multiterminal female type connector 81 is mounted on the transverse portion of the U-shaped bracket 65.

Figure 3:
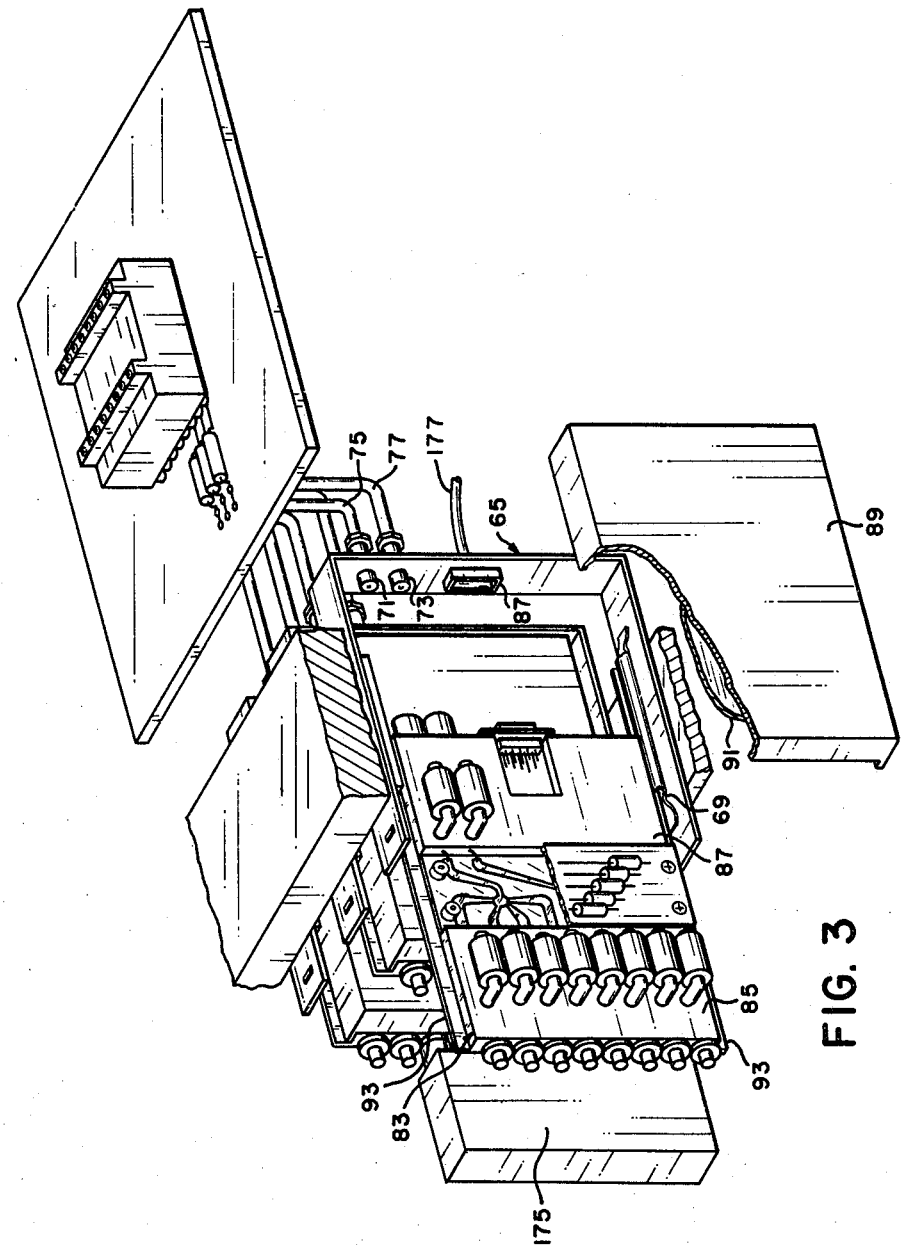
FIG. 3 is an exploded view of a path selector unit constructed in accordance with the present invention and illustrating the manner in which it is removably inserted into a bracket and electrically connected to the test station.

Each path selector unit 67 is adapted to provide two separate electrical paths, for the conduction of DC, RF and pulse signals, which may be connected to the two coaxial connectors 71 and 73 mounted on the transverse portion of a U-shaped bracket 33 by insertion between the parallel portions thereof. As shown in FIG. 3, each pair selector unit has a base portion, generally indicated at 83, with first and second interconnected spaced channel zones 85 and 87 formed therein which are normally enclosed by a cover 89 having an electrical shield 91 therein. In addition, laterally opposite and longitudinally extending flanges 93 formed on the sides of the path selector base 83 which are adapted to slidably engage the guide channels 69 on the parallel portions of the U-shaped bracket 65 to ensure the proper alignment of the path selector unit 67 as it is inserted into the bracket 65.

Figure 4:
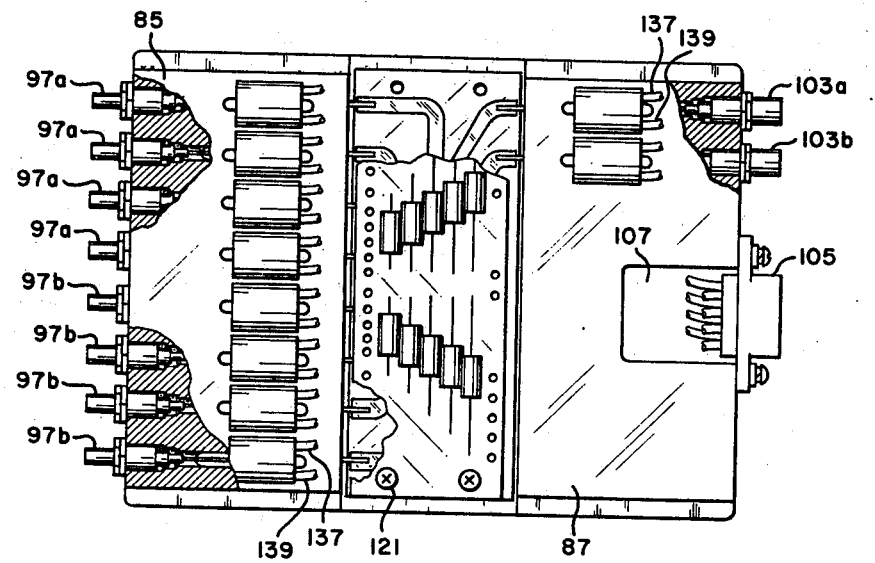
FIG. 4 shows a schematic plan view of a path selector unit illustrating the plurality of coils and diodes associated with the dual electrical path provided by each path selector unit.
Figure 5:
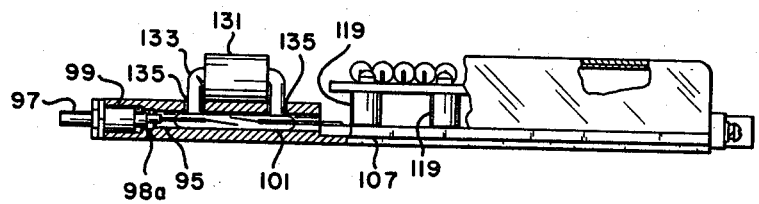
FIG. 5 is a partial cutaway side view of a path selector unit illustrating the manner in which the switches disposed in the bores of the path selector unit form coaxial transmission lines connected between an impedance matching connection and coaxial terminals.

Each separate electrical path provided by a path selector unit 67 is formed from a plurality of first coaxial transmission lines, each having a common characteristic impedance, which are connected through a common junction of an impedance matching connection to a second coaxial transmission line having the same common characteristic impedance as the first coaxial transmission lines. As more particularly shown in FIGS. 4 and 5, in the first channel zone 85 each path selector of the base 83 are formed eight substantially parallel bores 95 each serving as the outer conductor of a first coaxial transmission line, generally indicated at 86, and having a common diameter. A coaxial connector 97 is inserted into a cylindrical recess 99 formed in each bore 95, at the end of the path selector base 83 and an additional cylindrical recess 98 is provided to maintain the common characteristic impedance by compensating for the physical connection of the reed switch lead and the coaxial terminal. A magnetically actuated reed switch 101, of the type hereinbefore described and serving as the center conductor of a first coaxial wave guide is disposed in each bore 95 and connected to the coaxial connector 97. The diameter of each bore 95, in relation to the cross-sectional area of each reed element of the switch disposed therein, is electrically determined to provide a common characteristic impedance taking into consideration variations in the cross sectional area of the reed elements and the dielectric media between the reed elements and the surface of the bore.

In the second channel zone 87 of each path selector base 83 are formed two substantially parallel bores 96, each serving as the outer conductor of a second coaxial transmission line, generally indicated at 88, and having the same common diameter as the bores 95 formed in the first channel zone 83 to provide the same common characteristic impedance. A snap-on type coaxial connector 103 is inserted into a cylindrical recess 100 formed in each bore 96 at the end of the path selector base 83. A magnetically actuated reed switch 102, of the same type hereinbefore described and serving as the center conductor of a second coaxial transmission line 88, is disposed in a close fit in each bore 96 and connected to the coaxial connector 103. In addition, a multiterminal slide-on type connector 105 is mounted at the end of the path selector base 83 in a cavity 107 formed in the second channel zone 87. Both the snap-on type coaxial connectors 103 and the slide-on type multiterminal connector 105 are mounted at positions adapted to engage the connectors 71, 73 and 81 mounted on the transverse portion of a U-shaped bracket 65 as the path selector unit 67 is slidably inserted into the bracket 65.

Figure 6:
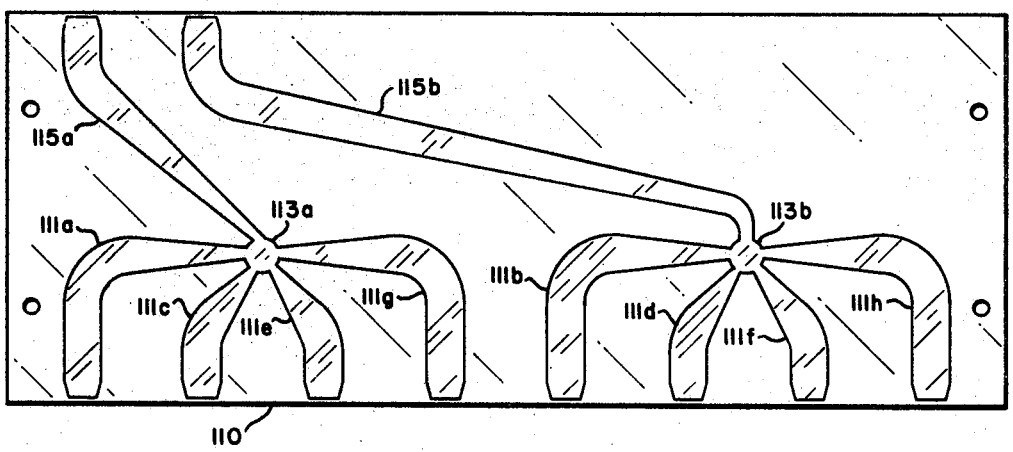
FIG. 6 shows the configuration of the impedance matching strip transmission line connection member disposed in each path selector unit.

Between the first and the second channel zones 83 and 85 of each path selector unit 67 is formed a channel 107 having a planar surface. Disposed in the channel 107 is an impedance matching strip transmission line connection member, generally indicated at 109. As more particularly shown in FIG. 6, two separate electrical strip conductors are formed on one planar surface of a dielectric board 110 with each conductor having four first electrical paths 111 each connected at a common junction 113 to a second electrical path 115. Each end of a first electrical path 111a is connected to the lead of a reed switch 101 of a first coaxial transmission line 86 in the first channel zone 83 while each end of a second electrical path 115 is connected to the lead of a reed switch 102 of a second coaxial transmission line 88 in the second channel zone 87.

Each strip conductor serves as the center conductor of an unbalanced strip transmission line 109 commonly referred to as a micro-strip, and is positioned substantially at the axis of the first or second coaxial transmission lines 86 and 88, while the planar surface of the channel 107 serves as the ground plane. At the junction of the reed switch leads and the separate strip conductors the characteristic impedance of each separate strip transmission line is maintained substantially the same as the common characteristic impedance of the first and second coaxial transmission lines 86 and 88 to prevent reflections resulting from impedance mismatches by closely controlling the distance between the center conductor and the ground plane in addition to decreasing the width of each strip conductor near the common junction 113 to compensate for the additional capacitance provided by the other transmission lines being open from the common junction 113 to the contact portions of the reed switches 101.

Figure 7:
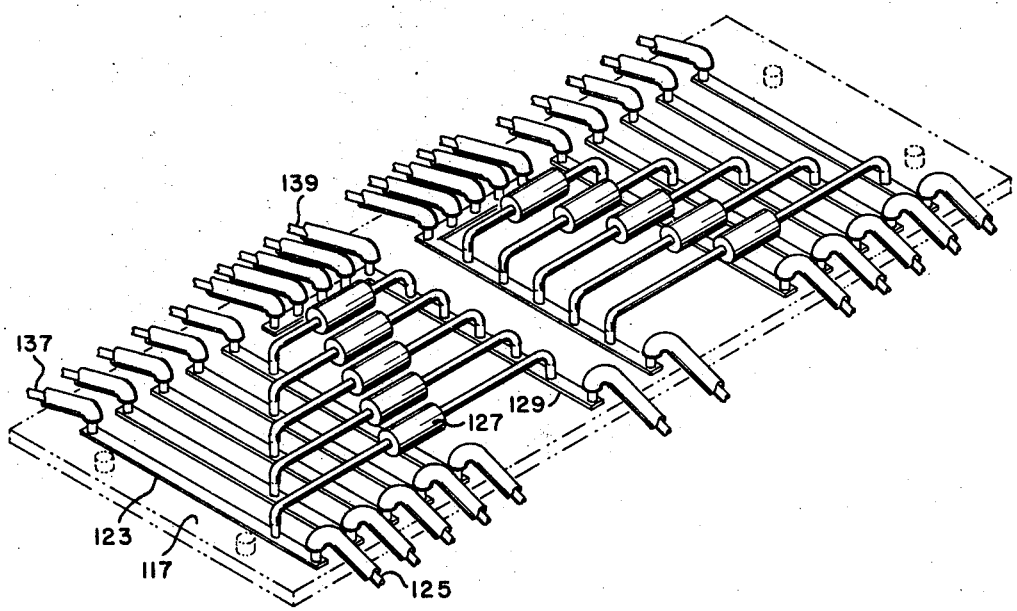
FIG. 7 shows the configuration of the conductor strips and the connections of the semiconductor diodes of the printed circuit board disposed in each path selector unit.

A printed circuit board, generally indicated at 117, is mounted on spacers 119 above the impedance matching strip transmission line connection member 109 and firmly held in place by screws 121 disposed in the spacers 119 and fastened to the path selector base 83. As more particularly shown in FIG. 7, on the lower side of the printed circuit board 117 are formed ten parallel conductor strips 123 each of which is connected by a short lead 125 to one of the terminals of the slide-on type multiple terminal connector 105 mounted in the cavity 107 in the second channel zone 87. On the upper side of the printed circuit board 117 are mounted ten semi-conductor diodes 127 each connected between a common L-shaped conductor strip 129 and a separate one of the ten parallel conductor strips 123.

A switch actuating means in the form of a plurality of coils 131 each wound on a horseshoe shaped core 133, as hereinbefore described, are mounted on the upper surfaces of both the first and the second channel zones 85 and 87 of the path selector base 83. The ends of each core 133 are disposed in a pair of spaced holes 135 extending laterally from each bore 95 and 96 adjacent to the opposite ends of the switches 101 and 102 disposed in the bores 95 and 96. Each of the coils 131 has first and second leads 137 and 139 one of which is connected through one of the ten parallel conductor strips 123 on the printed circuit board 117 while the other is connected to one of the L-shaped conductors 129 to form a parallel connection with one of the semi-conductor diodes 127. The semi-conductor diodes 127 serve as flyback diodes which provide a return path for transient voltages resulting from the deenergization of a coil 131.

Located at a distance which may desirably be remote from the test station 17 is a tester, shown schematically in block form and generally indicated at 141, which includes electrical equipment for performing DC, AC, and pulse tests to determine the electrical characteristics of a packaged integrated circuit 23, engaging the contacts 19 of the test station 17. In addition, the tester 141 includes a selector controller 143 to operate the switches 101 and 102 in each path selector unit 67 to control the application of selected signals to selected test station contacts 19 as well as DC measurements at the same or other selected test station contacts 19.

For performing DC electrical tests, the tester 141 has a plurality of DC electrical signal measuring devices 145, each connected by a coaxial cable 147 to a first coaxial transmission line connector 97a of an electrical path 111 provided by a path selector unit 67, and a plurality of controllable, regulated DC electrical signal generators 149, each connected by a coaxial cable 151 to a first coaxial transmission line connector 97b of the other electrical path provided by the path selector unit 67. Each DC measuring device 145 is adapted to measure the value of a DC electrical signal at the coaxial terminal 43 of the electrical path provided by the mechanical interface member 33 and connected to a test station contact 19, while each DC electrical signal generator 149 is adapted to produce and maintain a DC electrical signal having a selected value at the coaxial terminal 43 in response to the measured value at the coaxial terminal 43 to ensure the application of a DC electrical signal having the selected value to the test station contact 19.

For performing AC electrical tests, which may desirably be of a frequency extending from DC through the RF range the tester 141 has a plurality of RF measuring devices 153, each connected by a coaxial cable 155 and a probe 157 to the probe terminal 41 of an electrical path provided by the mechanical interface member 33, and a plurality of controllable RF electrical signal generators 159 each connected by a coaxial cable 161 to a first coaxial transmission line connector 97 of an electrical path provided by a path selector unit 67. Each RF measuring device 153 is adapted to measure the value of an RF electrical signal at the probe terminal 41, while each controllable RF electrical signal generator 159 is adapted to produce an RF electrical signal having a selected value at the probe terminal 41.

For performing electrical pulse tests, the tester 141 has a plurality of controllable electrical pulse signal generators 163 with one or more being connected by separate coaxial cables 165 to separate first coaxial transmission line connectors 97 of either or both electrical paths provided by a path selector unit 67. Each controllable electrical pulse generator 163 is adapted to produce an electrical pulse signal having a selected value at the probe terminal 41 of an electrical path on the mechanical interface member 33 and connected to a test station contact 19.

Furthermore, the tester has a plurality of RF electrical signal loads 167 and a plurality of electrical pulse signal loads 169 with one or more of each being connected by separate coaxial cables 171 and 173 to separate first coaxial transmission line connectors 97 of either or both electrical paths provided by individual path selector units 67. Each electrical load is adapted to be electrically connected to a test contact 19, to enable a packaged integrated circuit 23 engaging the test station contacts 19 to be tested under loaded conditions. In addition, load boxes 175 as more particularly shown in FIG. 3, each having a particular desired electrical load circuit therein and which may be either an active or a passive electrical load, may desirably be connected to the coaxial transmission line connectors 97 of selected path selector units 67 and provide other electrical loads and special combinations of electrical loads to enable a packaged integrated circuit 23 engaging the test station contacts 19 to be tested under a multitude of load conditions.

In addition, the tester 141 has a path selector controller 143 which is connected by multi-conductor cables 177 and 179 to each of the multiterminal connectors 81 mounted in the transverse portions of the plurality of U-shaped brackets 65 and to each of the switch-actuating coils 57 on the mechanical interface member 33. The path selector controller 143 is adapted to produce control signals and apply them through the conductor cables 177 and 179 to selected coils 131 in selected path selector units 67 and selected coils 57 on the mechanical interface member 33 to operate the associated switches 101, 102 and 45 to form selected electrical paths for the conduction of electrical signals to the test station contacts 19 connected to the selected electrical paths, thereby causing selected electrical signals to be applied to selected test station contacts and the results thereof measured to determine the electrical characteristics of a packaged integrated circuit 23 engaging the test station contacts 19.

In operation, when a packaged integrated circuit 23 undergoes a DC electrical test operation by the test apparatus 11, it may desirably be submerged for a period of time in the temperature controlled fluid bath 15 for temperature conditioning and stabilization and then placed on the test station 17 in an aligned position enabling each of the test station contacts 19 to engage one of the externally exposed packaged integrated circuit leads 21. Next, the selector controller 143 will produce and supply a plurality of electrical control signals through the conductor cables 177 and 179 to the coils 57 of selected electrical paths on the mechanical interface member 33 and to the coils 131 of selected first coaxial transmission lines 86 and second coaxial transmission lines 88 of an electrical path provided by selected path selector units 67 electrically connected at the coaxial terminals 43 to the selected electrical paths on the mechanical interface member 33.

The energization of each coil 57 and 131 by a control signal produces a magnetic field having lines of flux extending from the ends of the core through the reed elements of the associated reed switch 45, 101 and 102 and across the gap therebetween. The magnetic flux exerts an attractive force between the contact portions of the reed elements which deflect them from a quiescent, unstressed position into electrical engagement with each other to complete the selected electrical path on the mechanical interface member 33 and an electrical path in each selected path selector unit 67 which connects a DC measuring device 145 to the coaxial terminal 97.

In addition, the selector controller 143 produces and supplies a plurality of electrical control signals through the conductor cables 177 to the coils 131 of selected first coaxial transmission lines 86, and the second coaxial transmission lines 88 of the other electrical path provided by selected path selector units 67, electrically connected at the coaxial terminals 43 to selected electrical paths on the mechanical interface member 33. The application of the control signals causes the associated reed switches 101 and 102 to be actuated, as previously described, to complete the other electrical path in selected path selector units 67 to each connect a controllable regulated DC electrical signal generator 149 to a selected test station contact 19.

Through one electrical path provided by each selected path selector unit 67, each DC electrical signal generator 149 applies a DC electrical signal to a test station contact 19 which has a selected value at the coaxial terminal 43 and maintains that selected value in response to the measured value provided by the DC measuring device 145 electrically connected by the other electrical path of the same path selector unit 67 to the coaxial terminal 43. The response of a packaged integrated circuit 23 to the selected DC electrical signals applied at selected test station contacts 19 is measured at other selected test station contacts 19 by other DC measuring devices 145 to determine the electrical characteristics of the packaged integrated circuit 23 and which are connected through the electrical paths on the mechanical interface member 33 and the electrical paths provided by other path selector units 67.

Upon completion of the DC test operation, the control signals produced by the selector controller 143 and supplied to selected switch actuating coils 57 and 131 throughout the test apparatus 11 are terminated and the switch actuating coils 57 and 131 are deenergized. The semiconductor flyback diodes 63 and 127 connected across the switch actuating coils facilitate the deenergization of the coils by providing a return path for voltages induced in each coil by the collapsing magnetic field. The deenergization of the switch actuating coils removes the magnetic lines of flux from the reed elements and permits the spring force, resulting from the deflection of each reed element from its quiescent position, to return the reed elements to their quiescent position and thereby disconnect the electrical paths of the mechanical interface member 33 and the path selector units 67.

When a packaged integrated circuit 23 undergoes an RF electrical test operation by the test apparatus 11, it may desirably be temperature conditioned and stabilized as previously described before being placed on the test station 17 with the externally exposed leads 19 each engaging one of the test station contacts 19. Electrical probes 157, each connected by a coaxial cable 155 to an AC measuring device 153 of the tester 141, are attached to the probe terminals 41 beneath the mechanical interface member 33 of selected electrical paths on the upper surface of the mechanical interface member 33. Then, the selector controller 143 will produce and supply a plurality of electrical control signals through the conductor cables 179 to the coils 57 of selected electrical paths on the mechanical interface member 33 thereby actuating the associated reed switches 45, in the manner previously described, and connecting the coaxial terminal 43 of the selected electrical path to selected test station contacts 19.

Next, the selector controller 143 produces and supplies a plurality of electrical control signals through the conductor cables 177 to the coils 131 of selected first coaxial transmission lines 86 and the second coaxial transimssion lines 88 of an electrical path provided by selected path selector units 67. The application of the control signals causes the associated reed switches 101 and 102 to be actuated, as previously described, to connect through each selected path selector unit 67 a controllable RF electrical signal generator 159 to a selected path on the mechanical interface member 33 which is connected to a test station contact 19. Through the electrical path provided by each selected path selector unit 67, each RF electrical signal generator 159 applies an RF electrical signal having a selected value to a test station contact 19. The value of the RF electrical signal being applied to the test station contact 19 may be measured, and the RF electrical generator 159 adjusted accordingly, by an RF measuring device 153 connected through a probe 157 to the probe terminal 43 of the electrical path on the mechanical interface member 33 by which the RF electrical signal is applied to the test station contact 19. In addition, the selector controller 143 may produce and supply a plurality of electrical control signals through the conductor cables 177 to the coils 131 of the selected first coaxial transmission lines 86 and the second coaxial transmission lines 88 of an electrical path provided by selected path selector units 67 to actuate the associated reed switches 101 and 102 to connect an electrical load either in a load box 175 or provided by the tester 141 to a selected test station contact 19, thereby enabling the packaged integrated circuit 23 to be tested under loaded conditions.

The response of the packaged integrated circuit 23 to the selected RF electrical signals applied at selected test station contacts 19 is measured at other selected test station contacts 19 by other RF measuring devices 153 to determine the electrical characteristics of the packaged integrated circuit 23 and which are connected through the probes 157 and the electrical paths on the mechanical interface member 33. Upon completion of the RF test operation, the control signals produced by selector controller 143 and supplied to selected switch actuating coils 57 and 131 throughout the test apparatus 11 are terminated, thereby deactuating the coils as previously described to disconnect the electrical paths of the mechanical interface member 33 and the path selector units 67.

When a packaged integrated circuit 23 is subjected to electrical pulse testing by a test apparatus 11, the electrical connections and the operation sequence is the same as for an RF electrical test operation with the exception that the selector controller 143 produces and supplies control signals to the coils 131 of selected first coaxial transmission line 86 and the second coaxial transmission lines 88 of electrical paths provided by selected path selector units 67 to connect electrical pulse signal generators 163 to selected test station contacts 19 and selected electrical loads either in load boxes 175 or as provided by the tester 141 to other selected test station contacts 19. The electrical pulse signal applied to the selected contacts 19 may be monitored by a measuring device connected through suitable probe 157 to the probe terminal 43 of an electrical path on the mechanical interface member 33 to ensure that it has the proper rise time, amplitude, and fall time. The response of the packaged integrated circuit 23 to the selected electrical pulses may be measured at other selected test station contacts 19 by other pulse measuring devices of the tester 141 which are connected through probes 157 to the probe contacts 43 of the electrical paths connected to the other selected test station contacts 19.

That which is claimed is:

1. Apparatus for testing a packaged electrical circuit having a plurality of externally exposed leads, comprising:
   a test station having a plurality of electrical contacts each adapted to be engaged by a lead of a packaged electrical circuit and forming an electrical circuit path to enable electrical signals to pass through a packaged electrical circuit engaging the test station contacts,
   a plurality of switching control units each providing first and second separate electrical circuit paths for the conduction of electrical signals and being connected to the electrical circuit path of a test station contact, each of said switching control units comprising a base having first and second interconnected spaced channel zones formed therein, a plurality of bores formed in the first spaced channel zone of said base, each serving as the outer conductor of a first coaxial transmission line and having substantially axially disposed therein a switch serving as the center conductor of said first coaxial transmission line, said first coaxial transmission lines forming said first and second electrical circuit paths, a plurality of bores formed in the second spaced channel zone of said base, each serving as the outer conductor of a second coaxial transmission line and having substantially axially disposed therein a switch serving as the center conductor of said second coaxial transmission line, each center conductor of said second coaxial transmission lines engaging the electrical circuit path of a test station contact, and an impedance-matching connection being positioned between said first and second interconnected spaced channel zones, comprising a dielectric board having substantially parallel sides, first and second separate electrical conductors mounted on one parallel side of said dielectric board and each having a plurality of first electrical strip conductors electrically connected at a common junction to a second electrical strip conductor with each of the first electrical strip conductors being electrically connected to the center conductor of one of the plurality of first coaxial transmission lines and the second electrical strip conductor being electrically connected to the center conductor of the second coaxial transmission line,
   said switches each having first and second electrical conditions being nonconductive in said first electrical condition and conductive in said second electrical condition and adapted to change from said first electrical condition to said second electrical condition in response to a control signal applied to the associated switch actuating means,
   a tester adapted to apply and measure the result of selected electrical signals to determine the electrical characteristics of a packaged electrical circuit engaging the contacts of said test station, said tester having:
       a plurality of controllable regulated electrical signal generators each electrically connected to a center conductor of the first coaxial transmission lines forming said first electrical circuit paths of the switching control units and adapted to produce an electrical signal having a selected value at the electrical circuit path of a test station contact in response to the measured value of the electrical signal at the common junction,
       a plurality of measuring devices each electrically connected to a center conductor of the first coaxial transmission lines forming said second electrical circuit paths of the switching control units and adapted to measure the value of an electrical signal at the electrical circuit path of a test station contact, and a switch controller electrically connected to the associated actuating means of each switch in each of the plurality of switching control units and adapted to apply control signals to the actuating means of selected switches of selected control units to change the electrical condition of the switches from the first electrical condition to the second electrical condition to provide electrical circuit paths for the application of selected regulated electrical signals produced by said controllable regulated electrical signal generators to a packaged electrical circuit engaging said test station contacts and the measurement of the values of the electrical signals at selected test station contacts.

2. Apparatus for testing the packaged electrical circuit according to claim 1:

said switches being reed switches having actuating coils, said actuating coils being disposed in each of said switching control units in substantially parallel and lateral alignment with respect to each other and wound about their cores in respectively opposite directions to reduce the mutual inductance therebetween and having diodes connected between the terminals.

References Cited

UNITED STATES PATENTS 3,237,100  2/1966  Chalfin _____ 324—73

WILLIAM E. LINDQUIST, Primary Examiner

E. L. STOLARUN, Assistant Examiner

U.S. Cl. X.R.

324—51, 158